April 29, 1958     A. SHOTWELL     2,832,427
REMOTELY CONTROLLED ELECTRICALLY PROPELLED VEHICLE
Filed Aug. 22, 1956     3 Sheets-Sheet 1
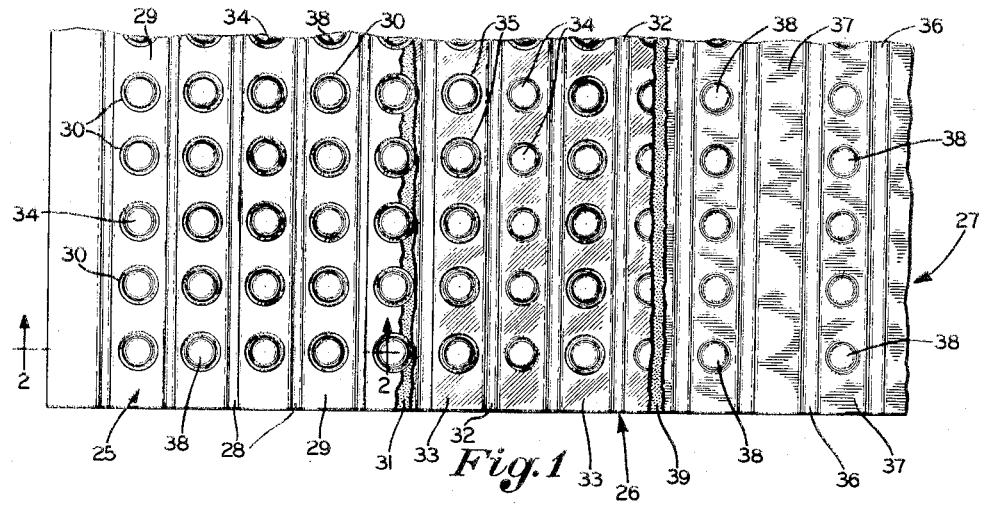
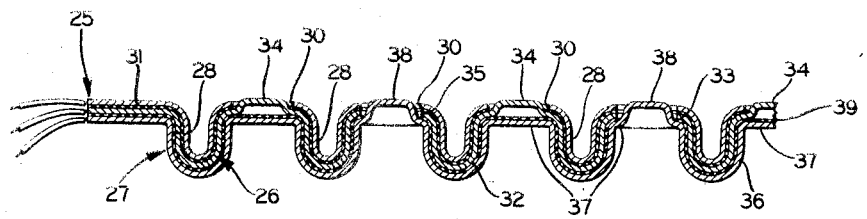
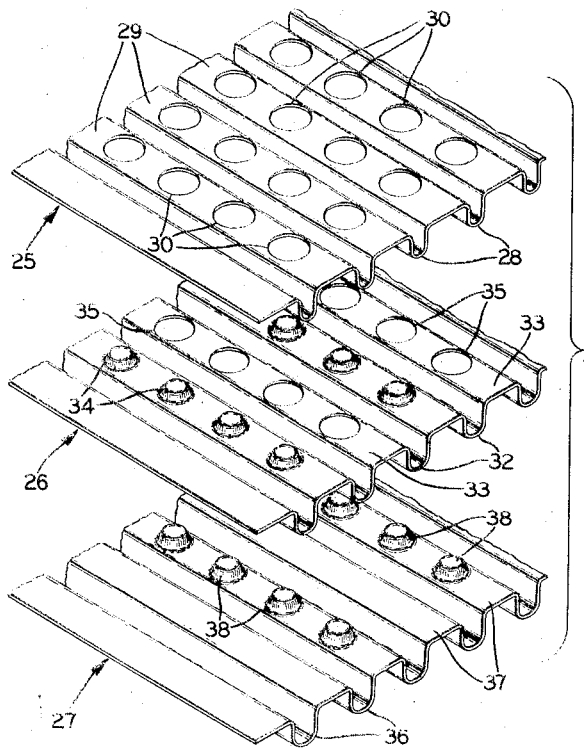
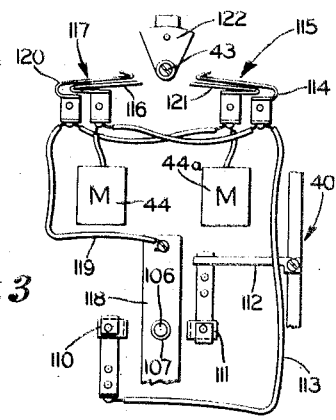
INVENTOR.
Allen Shotwell
BY Frease & Bishop
ATTORNEYS

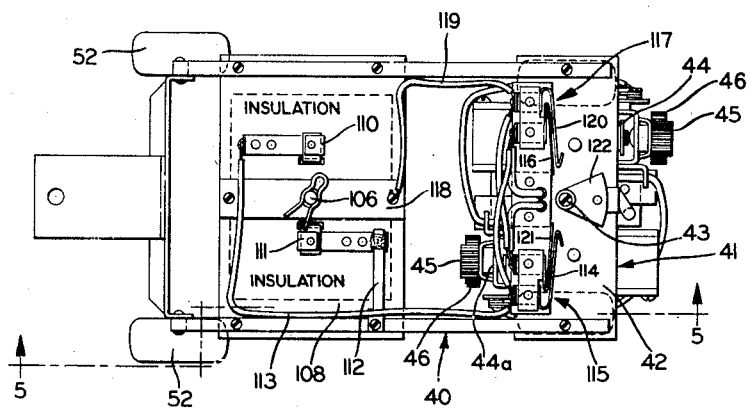
Fig. 4
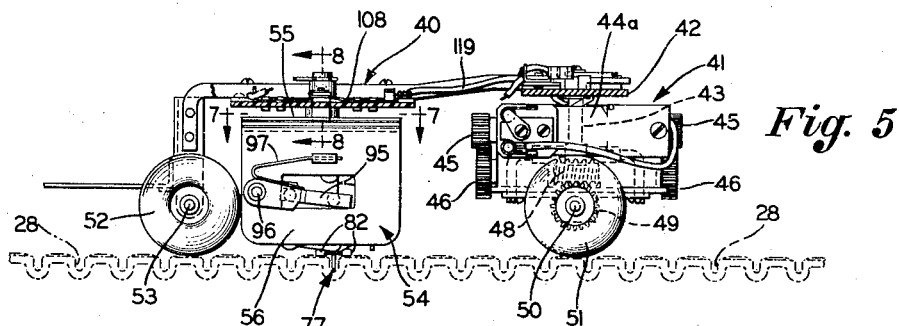
Fig. 5
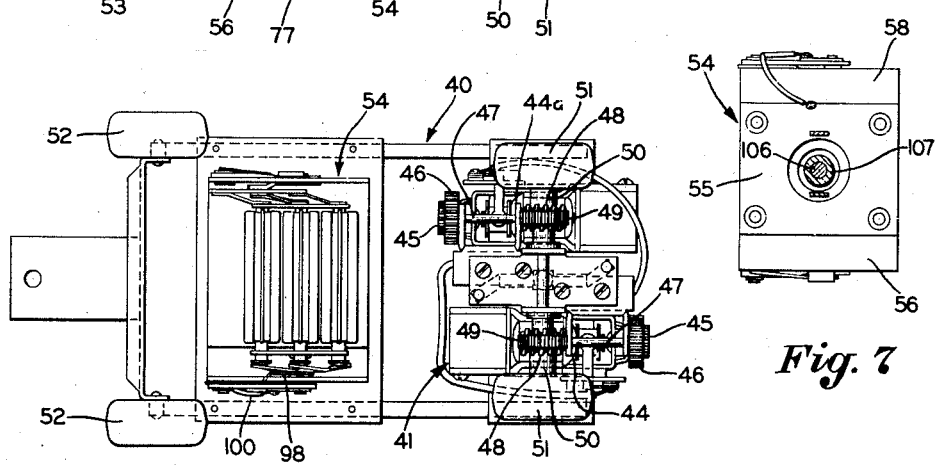
Fig. 6
Fig. 7
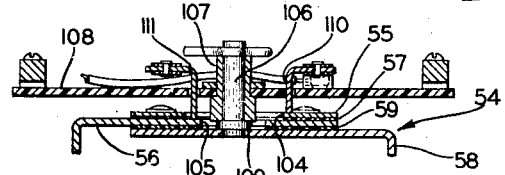
Fig. 8
INVENTOR.
Allen Shotwell
BY Frease & Bishop
ATTORNEYS April 29, 1958     A. SHOTWELL     2,832,427
REMOTELY CONTROLLED ELECTRICALLY PROPELLED VEHICLE
Filed Aug. 22, 1956     3 Sheets-Sheet 3

INVENTOR.
Allen Shotwell
BY
Frease & Bishop
ATTORNEYS

United States Patent Office 2,832,427
Patented Apr. 29, 1958

2,832,427

REMOTELY CONTROLLED ELECTRICALLY PROPELLED VEHICLE

Allen Shotwell, near Elizabeth, Pa.

Application August 22, 1956, Serial No. 605,640

5 Claims. (Cl. 180—2)

The invention relates to remotely controlled electric vehicles of the type disclosed in my prior application, Serial No. 356,257, filed May 20, 1953, now Patent No. 2,768,697, dated October 30, 1956, of which this application is a continuation in part, and more particularly to improvements in the pickup means of the vehicle and in the platform upon which it operates.

In said prior application the pickup device included toothed wheels adapted to rotate over the platform or tracks, the teeth of these toothed wheels engaging conductors located in spaced grooves in the platform or track, while other means such as a brush or shoe slidably engaged other conductor surfaces located above and between the grooves.

As each toothed wheel is moved across the platform or track the teeth thereof move in an arc as they pass into and out of the grooves on the platform. This necessitates very accurate spacing of the conductors upon the platform or track and also of the teeth upon the toothed wheel in order that said teeth will contact only the conductors located in the grooves.

The construction of the platform or track in my prior application was also expensive in that it was formed of a great number of relatively small parts making the construction thereof tedious and complicated.

It is therefore an object of the present invention to simplify both the pickup and the platform or track.

Another object is to provide a pickup wheel having teeth suspended vertically thereon for engagement in the grooves of the platform or track, the teeth remaining vertical at all times.

A further object is to provide a pickup device comprising contact members located on opposite sides of each tooth and insulated therefrom, and adapted to contact the conductors of the platform or track on either side of the grooves therein.

A still further object is to provide a simplified construction of platform or track comprising a plurality of superposed grooved conductor sheets with insulation therebetween, the uppermost sheet or sheets having spaced apertures therein through which protrude projections upon the lowermost sheet or sheets.

It is also an object of the invention to provide a modified construction of pickup in the form of a continuous link belt.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings, in which;

Fig. 1 is a fragmentary top plan view of the improved platform or track with parts broken away for the purpose of illustration;

Fig. 2 is an enlarged sectional view through the platform taken as on the line 2—2, Fig. 1;

Fig. 3 is an exploded fragmentary perspective view of a portion of the platform;

Fig. 4 is a top plan view of the vehicle;

Fig. 5 is a longitudinal section through the vehicle taken as on the line 5—5, Fig. 4;

Fig. 6 is a bottom plan view of the vehicle;

Fig. 7 is a plan sectional view taken as on the line 7—7, Fig. 5;

Fig. 8 is an enlarged vertical sectional view taken as on the line 8—8, Fig. 5;

Fig. 9 is an enlarged top plan view of the pickup mechanism removed from the vehicle, parts being broken away for the purpose of illustration;

Fig. 10 is a vertical sectional view of the pickup wheel taken as on the line 10—10, Fig. 9;

Fig. 11 is an end view of one end of the pickup mechanism;

Fig. 12 is a section through the pickup mechanism taken as on the line 12—12, Fig. 11;

Fig. 13 is a transverse section through the pickup wheel taken as on the line 13—13, Fig. 12;

Fig. 14 is a horizontal section through the pickup wheel taken as on the line 14—14, Fig. 13;

Fig. 15 is an enlarged section taken as on the line 15—15, Fig. 14;

Fig. 16 is a fragmentary transverse section taken as on the line 16—16, Fig. 15;

Fig. 17 is a fragmentary transverse section taken as on the line 17—17, Fig. 15;

Fig. 18 is a front elevation of a modified pickup device in which the pickup wheel is in the form of a link belt;

Fig. 19 is an end view of the pickup wheel shown in Fig. 18, with parts broken away;

Fig. 20 is an enlarged fragmentary plan view of two of the links of the pickup wheel shown in Figs. 18 and 19;

Fig. 21 is a section on the line 21—21, Fig. 20;

Fig. 22 is a section on the line 22—22, Fig. 20; and

Fig. 23 is a wiring diagram of the vehicle.

Referring first to the track or platform shown in Figs. 1 to 3, this track is made up of a plurality of metal sheets, at least the upper of which is provided with spaced, parallel grooves. In the drawings three metal sheets are shown, indicated generally at 25, 26 and 27.

These sheets may be formed of any suitable sheet metal providing a good electric conductor. The uppermost sheet 25 is provided with spaced, parallel grooves 28 of suitable depth and spacing for receiving the teeth of a pickup wheel.

Each of the high portions 29, between adjacent grooves 28, is provided with a plurality of spaced openings 30. The metal sheet 26 is insulated from the top sheet 25 as by a layer of insulation material 31 having openings therein corresponding to the openings 30 in the upper sheet 25.

The conductor sheet 26 may, if desired, be provided with parallel grooves 32 to receive the grooves 28 of the top sheet 25, and with the intervening high portions 33. As shown in the drawings, projections 34 are provided upon alternate high portions 33 of the intermediate conductor sheet 26, while the intervening high portions 33 thereon are provided with spaced apertures 35.

The spacing of the projections 34 and of the apertures 35 on the intermediate conductor sheet 26 are the same as the spacing of apertures 30 on the top conductor sheet 25. Thus, when the conductor sheets are assembled as in Figs. 1 and 2, the projections 34 on the intermediate sheet 26 project through alternate rows of apertures 30 in the top sheet 25, while the apertures 35 of the sheet 26 register with the intervening rows of apertures 30 in the top sheet 25.

The lower conductor sheet 27 may also be provided with grooves 36 and intervening high portions 37. Rows of spaced projections 38 are formed on alternate high portions 37 of the lower conductor sheet 27 and project upward through the apertures 35 in the intermediate sheet 26 and the registering rows of apertures 30 in the top sheet, as shown in Figs. 1 and 2.

A sheet of insulation material 39 is located between the conductor sheets 26 and 27 and provided with apertures corresponding to the projections 38 of the lower conductor sheet and the apertures 35 of the intermediate sheet 26.

When this track or platform is assembled, as shown in Fig. 2, it will be seen that a three-conductor track or platform is provided, the grooves 28 in the top sheet 25 forming conductor surfaces for contact with one collector, such as the teeth of a pickup wheel, while the exposed projections 34 and 38 of the intermediate and lower conductor sheets 26 and 27, form separate conductor surfaces for contact with two other collectors.

The construction shown provides a three-conductor track. It will be understood that if only a two-conductor track is desired, such as shown in some instances in my copending application above referred to, only two metal conductor sheets may be used, projections upon the lower sheet projecting through apertures in the upper sheet.

Reference is now made to Figs. 4 to 17 showing an electrically propelled vehicle for operating upon the track or platform such as shown in Figs. 1 to 3, and having a pickup wheel with vertically movable teeth for engagement in the grooves of the track or platform.

The vehicle includes a frame, indicated generally at 40, within which is pivoted the front truck, indicated generally at 41, pivotally connected to the plate 42 of the frame as by the king pin 43. Within opposite sides of the front truck 41 are located two independent induction motors 44 and 44a.

A pinion 45 is fixed upon the shaft of each motor, each pinion meshing with a gear 46 upon a worm shaft 47 having a worm screw 48 therein meshing with a worm gear 49 upon the axle 50 of the corresponding traction wheel 51.

The wheels 51 are formed of suitable insulation material, such as pliable rubber or the like, so as to insulate the vehicle from the conductors on the platform or track, except for the pickup device as will be later described in detail.

The rear end portion of the frame is shown as provided with a pair of idler wheels 52, also of insulation material, journalled upon the frame as at 53 and adapted to roll upon the platform or track, as shown in Fig. 5.

The pickup device comprises a pickup wheel journalled within a bracket pivoted within the rear portion of the frame 40. In Figs. 4 to 17 the pickup wheel is shown as provided with vertically movable teeth for engagement in the grooves of the track or platform, sliding collectors being located on each side of each tooth and insulated therefrom for contact with the conductors on opposite sides of the grooves in the track or platform.

The pivoted bracket in which the pickup wheel is mounted is indicated generally at 54 and is formed of three conductor plates insulated from each other, namely the rectangular top plate 55, the intermediate L-shaped plate 56 insulated from the top plate as at 57 and the lower L-shaped plate 58 insulated from the intermediate plate as indicated at 59.

The pickup wheel includes the central shaft 60 upon opposite ends of which are fixed the hexagonal plates 61 and 62. The shaft, shown generally at 60, is formed of two aligned tubular metal portions 63 and 64 mounted in spaced relation upon the insulation rod 65.

One end of the shaft 60 is located through the hexagonal plate 62 and has an insulation collar 66 mounted thereon upon which is journalled the spring spider 67, the adjacent end of the shaft being carried by the insulation lever arm 68 fulcrumed as at 69 upon the conductor plate 58 of the pivoted bracket frame 54.

For this purpose a stud 70 is journalled in the adjacent end of the shaft 60 and into the insulation lever arm 68, a collar 71 being formed upon said stud and interposed between the insulation collar 66 and the lever arm 68.

A plurality of tubular conductor members 72 are journalled in the hexagonal plate 61 of the pickup wheel and an insulation rod 73 extends therethrough and a short metal tube 74 is mounted upon the outer end of said insulation rod, spaced from the tubular conductor 72 and journalled in the hexagonal plate 62.

A metal rod 75 is located axially through the insulation rod 73 and extends out through the end thereof upon which the conductor tube 74 is located, terminating in an enlarged rounded head 76. A vertically suspended tooth, indicated generally at 77, depends from each of the tubular conductors 72, being connected thereto by the lugs 78 and 79.

A pair of surface slides are mounted, one at each side of each of the vertical teeth 77, for contact with the conductors on opposite sides of the grooves in the track or platform. For this purpose a flat strip of insulation material 80 is located through the slot 81 between the vertical tooth 77 and the tubular conductor 72 and a channel shape conductor strip 82 is attached to each side edge of said insulation strip.

On one side of each tubular conductor 72 is an opening 83 through which is located a metal pin 84 connected to the metal rod 75. A U-shaped spring member 86 is connected at one end to the pin 84, the other end thereof bearing upon the adjacent surface slide 82.

On the opposite side a clip 87 extends laterally from the short tubular conductor 74 and one end of a spring 88 is fixed to said clip, the other end bearing on the surface slide 82 on that side of the tooth.

A stud 90 is journalled in the end of the tubular member 63 of the shaft 60 adjacent the hexagonal plate 61, said stud having an angular arm 91 fixed thereon. A stud 92 is fixed upon the outer end of the lever arm 91 and a hexagonal wheel 93 is journalled thereon.

The stud 92 is connected by the arm 94 with the end of the lever arm 95 pivoted as at 96 upon the conductor plate 56. A spring 97 normally urges the lever arm 95 downward.

The arms of the spring spider 67 contact the rounded heads 76 and a flat spring 98 contacts the center of the spider and is located through the opening 99 in the conductor plate 58 and extends beneath the pivot 70 of the insulation arm 68 in contact with the conductor plate 58.

A conductor wire 100 is connected to the pivot stud 70 and its other end is connected to the top conductor plate 55 of the U-shape bracket 54 in which the pickup wheel is mounted. Each of the tubular members 72 of the pickup wheel has a stud 101 journalled in the end thereof, adjacent the hexagonal plate 61, an angular arm 102 being fixed to said stud and carrying at its outer end a pivot stud 103, journalled in the hexagonal plate 93.

With this construction, as the vehicle is moved over the track or platform, the pickup wheel will be rotated about its axis, the vertically hung teeth 77 thereon moving vertically into and out of engagement with the grooves 28 of the track or platform, while the surface slides 82 on opposite sides of each tooth will contact the high points 34 and 38 on opposite sides of the grooves.

The circuit from the top conductor plate 25 of the track or platform will be carried from the groove 28 through the vertically movable teeth 77, tubular conductors 72, angular arms 102, rotatable hexagonal plates 93, arms 91 and 94 and lever arm 95 to the intermediate conductor plate 56 of the bracket in which the pickup wheel is supported.

From the high point on one side of the groove 28 current will pass through the spring-loaded surface slides 82 on that side of the tooth through the U-shaped springs 86, studs 84, rods 75, rounded heads 76, spider arms 67 and flat spring 98 to the lowermost conductor plate 58 of the bracket.

From the high point on the other side of the groove 28, current will pass through the spring-loaded surface slides 82 on that side of the tooth through the flat springs 88, through the short tubular conductors 74, hexagonal plates 62 to the shaft 60 and through the studs 70 and wire 100 to the upper conductor plate 55 of the pickup wheel bracket 54.

As best shown in Figs. 8 and 9, the upper conductor plate 55 of the bracket has a central opening 104 therein exposing a portion of the intermediate plate 56 therethrough, there being a conical opening 105 in the intermediate plate 56 exposing the central portion of the lower plate 58.

The pickup wheel bracket is adapted to pivot upon the king pin 106 fixed to the center of the lower conductor plate 58 of the bracket and journalled through the bushing 107 in the insulation member 108 of the frame. An enlarged shoulder 109 upon the lower portion of the king pin 106 contacts the lower end of the bushing 107, as best shown in Fig. 8.

A spring-loaded collector brush 110 on the insulation frame member 108 contacts the top plate 55 of the bracket and a spring-loaded collector brush 111, also upon the insulation member 108, contacts the intermediate plate 56, through the opening 104 in the top plate 55.

The collector brush 111 is connected by conductor 112 to the frame 40. The collector brush 110 is connected by wire 113 to switch contact 114 of switch 115 and then to switch contact 116 of switch 117, and thence to motor 44.

The king pin 106 is electrically connected through the bushing 107 and buss bar 118 and wire 119 with switch contact 120 of switch 117 and with switch 121 of switch 115 and then to motor 44a.

An insulation arm 122 is fixed upon the top of the king pin 43 and adapted to close either switch 115 or 117 as the front truck 41 turns in that direction. Thus, if current to motor 44 is cut completely off causing an abrupt turn of the vehicle, a stop is provided when sufficient angularity of the wheels is obtained, but since the lack of power to the motor on the inside wheel would cause the vehicle to stop unless the operator immediately restored power to the stop wheel, these switches 115 and 117 are provided.

As viewed in the diagram, Fig. 23, with the motor 44 stopped to cause abrupt turn in that direction, as the truck 41 turns in that direction the arm 122 will move the switch contact 120 of switch 117 into contact with the switch contact 116 closing said switch, so that power from the other motor 44a is supplied to the motor 44 so long as the switch 117 is closed.

When the truck 41 turns in the opposite direction the switch 115 will be closed in the manner above described. It should be understood that the conductors of the track or platform are connected by wires to a control means similar to that shown in my prior application above referred to, or to any conventional control means.

In Figs. 18 to 22 is shown a modified form of pickup wheel, an endless belt type of pickup or collector device being disclosed. A plurality of similar hinged links are provided, each comprising an insulation strip 123 having angular metal strips 124 attached to opposite edges, these metal strips being provided with hinge knuckles 125 connected together in conventional manner by hinge pins 126.

One of the metal angle members 124 of each link is connected to a metal contact plate 127 at one end of the link, while the angle member 124 on the opposite side of the link is connected to a similar contact plate 128 at the other end of the link.

These angle members 124 provide the contacts for contacting the high points of the track or platform, and they are aligned in pairs so that one adjacent pair of contact strips 124 will contact the buttons or high points of the track on one side of a groove and the next adjacent pair will contact the buttons or high points on the other side of the groove.

The tooth for engagement in the grooves of the track comprises a metal rod 129 having its ends bent at right angles as at 130 and slidably located through suitable apertures near each end of each link, the terminal portions thereof being bent toward each other at right angles, as indicated at 131, and having rollers 132 journalled thereon for a purpose to be later described.

A spring 133 is located beneath the inturned ends 131 of each tooth to normally urge the tooth upward or inward, moving the rollers 132 into contact with the substantially elliptical metal ramp 134 located around the insulation core 135. The metal ramp 134 may be connected by conductor wire 136 to the intermediate conductor plate 56 of the bracket in which the pickup wheel may be supported.

Elliptical metal end plates 137 and 138 are connected to opposite ends of the insulation core 135, the metal contact plates 127 and 128 respectively riding thereon. These plates 137 and 138 may be connected by suitable conductors to the lower and upper plates 58 and 55 respectively of the bracket 54. As the endless belt moves around the ramp 134 and the end plates 137 and 138, the teeth 129 will be moved in a vertical plane at the proper time to engage grooves 28 in the track or platform.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A platform for an electrically propelled vehicle having pickup means including tooth means and surface slide means, said platform comprising a sheet of conductor material having parallel grooves therein and spaced rows of apertures in the high points between said grooves, a second sheet of conductor material below said first mentioned sheet, insulation means between said sheets, spaced rows of projections upon said second sheet located through the apertures in the first sheet, and an electric circuit connected to said conductor sheets, said parallel grooves providing conductor means for contact by said tooth means, and said spaced rows of projections providing conductor means for contact by said surface slide means.

2. A platform as specified in claim 1, in which the second conductor sheet is provided with parallel grooves corresponding to the parallel grooves in the first mentioned sheet.

3. A platform for an electrically propelled vehicle having pickup means including tooth means and surface slide means, said platform comprising a sheet of conductor material having parallel grooves therein and spaced rows of apertures in the high points between said grooves, a second sheet of conductor material below said first mentioned sheet, insulation means between said sheets, spaced rows of projections upon said second sheet located through alternate rows of apertures in the first sheet, spaced rows of apertures in the second sheet located between said rows of projections, and registering with the remaining apertures in the first sheet, a third conductor sheet below the second sheet, insulation means between the second and third sheets, spaced rows of projections upon the third sheet located through the apertures in the second sheet and said remaining apertures in the first sheet, and an electric circuit connected to said conductor sheets, said parallel grooves providing conductor means for contact by said tooth means, and said spaced rows of projections providing conductor means for contact by said surface slide means.

4. A platform as specified in claim 3, in which the second conductor sheet and the third conductor sheet are provided with parallel grooves corresponding to the parallel grooves in the first mentioned sheet.

5. Apparatus comprising a platform having a plurality of series of spaced parallel conductors thereon, there being parallel grooves in the platform in which one series of the conductors is located, an electrically propelled vehicle adapted for movement over the platform, electric motor means on the vehicle, traction wheel means operatively connected to the motor means, electric pickup means on the vehicle and electrically connected to the motor means, said pickup means comprising an endless series of vertically movable pick-up teeth contacting the conductors in said grooves and surface slide means located upon both sides of each tooth and insulated from each other and from the pick-up teeth, said surface slide means being relatively vertically movable upon the pick-up teeth, and an electric circuit connected to said conductors.

References Cited in the file of this patent

UNITED STATES PATENTS

| | | |
|---|---|---|
| 1,305,401 | Nyenhuis | June 3, 1919 |
| 1,459,361 | Cole | June 19, 1923 |
| 2,768,697 | Shotwell | Oct. 30, 1956 |